United States Patent Office 2,914,725
Patented Nov. 24, 1959

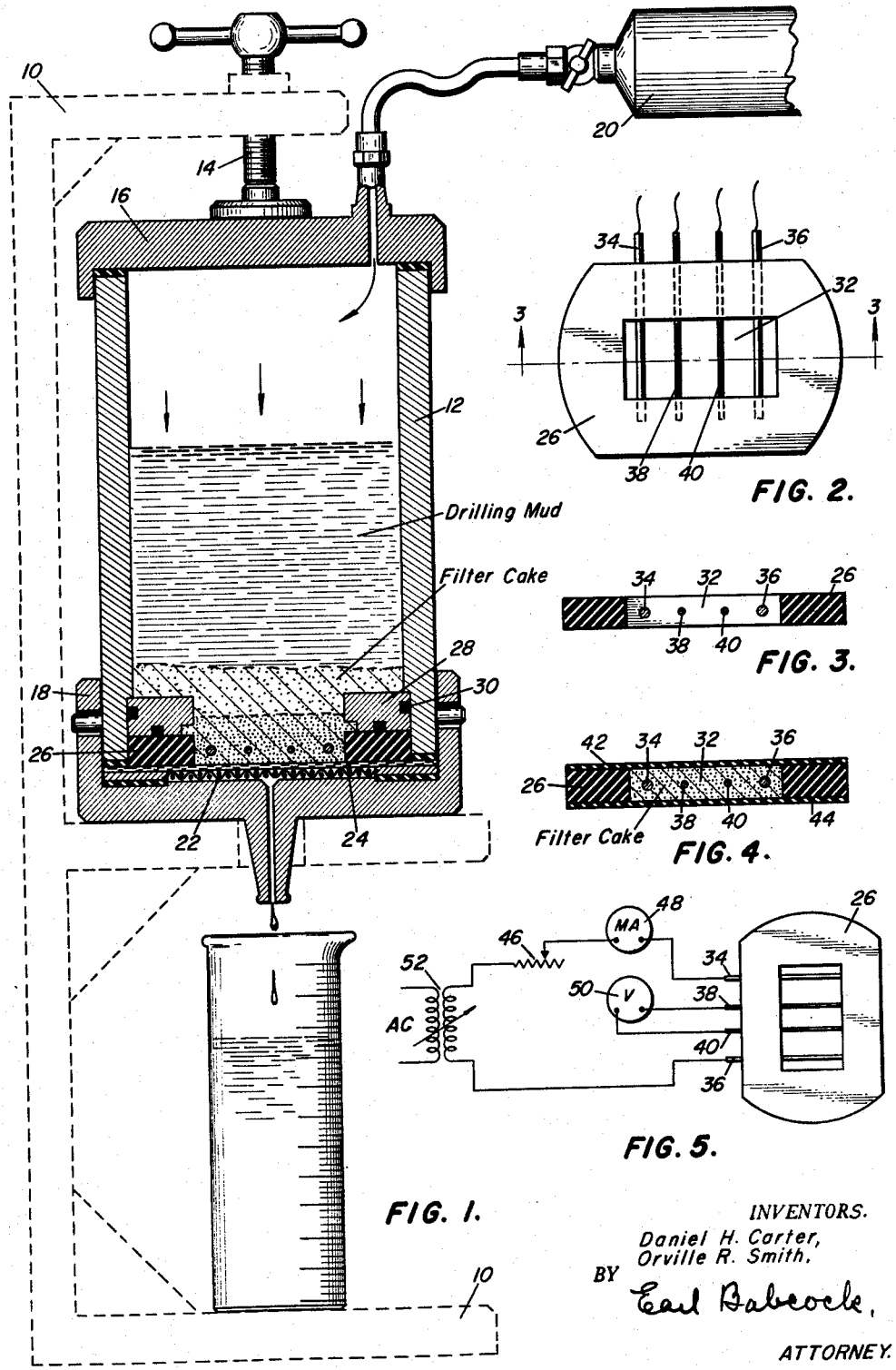

2,914,725

DRILLING MUD FILTER CAKE RESISTIVITY MEASUREMENT

Daniel H. Carter and Orville R. Smith, Houston, Tex., assignors, by mesne assignments, to Welex, Inc., a corporation of Delaware Application June 4, 1956, Serial No. 589,206

7 Claims. (Cl. 324—30)

This invention generally relates to electrical resistivity measurements and more particularly relates to methods and apparatus for measuring the resistivity of drilling mud filter cake.

Electrical resistivity measurements of earth formations traversed by a well bore are presently obtained with methods and apparatus which are well known to those skilled in this art. The recorded resistivities thus obtained are known to be the results of several variable factors, among which are the resistivities of the drilling mud, the mud filter cake deposit on the well bore walls, the mud filtrate encroachment in the zone immediately adjacent to the well bore, and also that of the undisturbed formation.

In order to establish constants for as many of such variables as possible at a particular well independent determinations are usually made of the drilling mud, the mud filter cake, and the mud filtrate. The logging records of such a well are then interpreted in view of this information. It may well be seen that the accuracy of such independent measurements will largely influence such interpretation.

Common practice for measuring the mud filter cake resistivity has been to obtain deposits of the cake by use of a gas pressured filter press and then to transfer the cake from the press to a measuring cell with a spatula or the like. Such cells have chambers of known dimension and suitable electrodes spaced therein for determining the resistivity of the mud thus placed. The liquid filtrate pressed from the sample may also be measured by the same cell.

The measurements made as previously described are ofttimes erratic, resulting in severe errors. Such errors have been found to be caused by several factors such as, aeration and contamination when transferred to the measuring cell, and possibly, depending on the time element and relative humidity, to dehydration. The mud cake deposit in the press was also found not to be electrically uniform such that the one layer of deposition may be electrically different than other layers. The resistivity of a specimen taken only from the top and transferred to the apparatus will usually be different than a specimen taken from other parts of the same sample. Efforts to overcome this by thoroughly mixing the sample then tend to aerate and dehydrate the sample, previously mentioned as undesirable.

A mud cake, as deposited along the walls of a well bore, has also been found to be electrically anisotropic in nature, and when thus deposited exhibits an electrical resistivity taken in a direction parallel to said deposit that differs from the resistivity taken in a direction normal to said deposit. To be consistent, therefore, each measurement should be taken in a standard direction through an undisturbed sample of such mud cake. The method and apparatus provided by this invention provides such standard conditions.

It is therefore the general objects of this invention to provide an improved method for preparing and measuring the electrical resistivity of such mud filter cake specimens which will simulate the cake found in a well bore to obtain accurate, uniform, and reliable measurements, and to provide improved apparatus for accomplishing said method.

Briefly described, the invention is a resistivity cell adapted to be placed in a filter press in such a manner that the mud filter cake fills the measuring chamber of said cell as said cake accumulates upon separation from the mud filtrate. Selectively spaced current and voltage electrodes are provided in the cell which are evenly and uniformly embedded in the filter cake concurrent with the accumulation process, thus affording optimum electrical contact between said mud cake and said electrodes. The electrical resistivity of the naturally accumulated filter cake in said chamber is then determined by passing a small alternating current through the current electrodes and measuring the voltage drop across voltage electrodes which are located intermediate said current electrodes.

For further objects and advantages of the invention and for a more complete description thereof, reference may be had to the following description taken in conjunction with the accompanying drawing in which:

Figure 1 is a view in elevation of a gas pressured filter press showing a cross section of the sample container in which is mounted the measuring cell provided by this invention.

Figure 2 is a view of the measuring cell showing the electrode arrangement and the geometry of the mud specimen chamber.

Figure 3 is a view in cross section of the measuring cell taken at 3—3 of Figure 2.

Figure 4 is a view in cross section of the specimen chamber of the measuring cell as shown in Figure 3 taken with a naturally deposited filter cake specimen prepared for measurement.

Figure 5 is a schematic view illustrating a suitable resistivity measuring circuit.

As illustrated in Figure 1, a gas pressured filter press is shown at 10 which has a sample container 12 securely supported therein by a clamping screw 14. The container is sealed gas tight at both ends by a gasketed upper cap 16 and a gasketed lower cap 18. The upper cap 16 has communication provided therein to a gas pressure source 20. This source 20 provides gas to the cup at a suitable pressure. The lower cap 18 has communication therein for the exit of the mud filtrate that is pressed from the mud. Retained in sealed relation by contact of the lower cap 18 with container 12 is a filtering means provided by a closely meshed screen 22 covered by a filter paper 24. As provided, any liquids pressed from container 12 must pass through said filtering means.

A measuring cell 26 is positioned immediately above filter 24 by a positioning ring 28. Ring 28 has an opening therethrough to provide fluid passage to the cell 26 and sealing means 30 intermediate said ring and container 12 to insure such passage.

Now referring to Figures 2 and 3, there is shown a detailed view of the cell 26 as provided by this invention. The cell 26 is provided of some impermeable insulating material, acrylic plastic being an example, and is in the form of a circular wafer. Said wafer is of uniform thickness and has a slot provided in the center thereof which forms a filter cake specimen chamber 32. Due to the uniform thickness of said wafer, and to the sides of the slot being parallel the chamber 32 has a constant sectional area throughout its effective length.

Located near either end of the chamber 32 are a first current electrode 34 and a second current electrode 36. Said electrodes are positioned through said chamber at right angles to the longest dimension thereof and midway the wafer thickness. Intermediate of, parallel to, and on the same plane with said current electrodes are a first voltage electrode 38 and a second voltage electrode 40. A chordal segment of the wafer forming cell 26 has been deleted, so allowing the terminals of said electrodes to be exposed and yet remain within the close necessary to insert said cell into the container 12.

Figure 4 illustrates the cell 26 in cross section with a filter cake specimen accumulated therein, as later described, and prepared for measurement. Shown at 42 and 44 are impermeable and insulating covers which are provided to preserve the specimen in the desired natural condition. These covers may be, for example, of plastic or rubber tape.

Now referring to Figure 5, the filter cake specimen completes a circuit having therein current electrodes 34 and 36, a variable transformer 52, a variable resistor 46, and a milliammeter 48. The primary winding of the transformer 52 is connected to an alternating current source (not shown) of suitable voltage and frequency. The voltage electrodes are connected to a suitable voltmeter 50 of a type which will draw essentially no power from the system to be measured. A vacuum tube meter having a separate power source will be suitable.

In operation the cell 26 is positioned in the container 12 as illustrated in Figure 1 and latched therein by lower cap 18. The container 12 is then filled with the mud sample to be measured. The upper cap 16 is placed thereon and the entire assembly then firmly clamped in the press. A beaker is placed, as shown, to receive the mud filtrate, and pressure from the source 20 is introduced into the container 12. As previously stated, the pressure source 20 provides a suitable pressure which will herein be, for example, 100 p.s.i.

Upon being pressured, the mud filtrate is forced through filter 24, leaving a naturally accumulated deposit of filter cake on said filter. As this filtering action continues, often over a period of several hours, said deposit gradually thickens and becomes more solid. As seen in Figure 1, the electrodes are provided in such a position that the filter cake is accumulated on all exposed sides of said electrodes in a uniform and intimate manner. It may thus be seen that the entire specimen which accumulates in chamber 32 does so in a natural and undisturbed fashion.

At such time as sufficient mud cake has accumulated in chamber 32 and sufficient mud filtrate has been withdrawn for a separate measurement, pressure is released from the container and said container is removed from the press and carefully dismantled. The cell 26 is removed therefrom, care being taken to keep the filter cake specimen in undisturbed condition. It may be seen, in comparing Figures 1 and 4, that at this time the cake specimen exceeds the confines of chamber 32 and such excess must be removed therefrom to provide a specimen of constant and standard dimension. Thus this excess cake is carefully planed from the specimen by a straight edged blade or the like to the face surfaces of the cell wafer 26 and the covers 42 and 44 are then immediately applied. The specimen is now ready for measurement.

The cell 26, now containing a mud cake specimen to be measured, is placed in the measuring circuit as illustrated in Figure 5. Power, for example, one hundred volts at one thousand cycles, is now supplied to transformer 52 which is set at zero output. The output of said transformer is then adjusted to provide a very small constant current through the previously described circuit. The resistor 46 may now be adjusted to provide calibration of greater fineness for this current flow. It is noticed that the impressed voltage need only be sufficient to creat the current flow desired and further need not be known or considered.

Temperature deviations cause variations in the resistivity of the mud cake specimen. Very small current settings are therefore desirable to minimize any heating of the specimen to be measured. As an example, a current of one milliampere was used and found to cause negligible heating effects. It is also pointed out that all the measuring operations herein described are to be conducted at a temperature established as standard, 70° F. being an example.

With a current of one milliampere passing through the mud cake specimen, the voltmeter connected to voltage electrodes 38 and 40 is read and the voltage drop thereacross determined. If, for example, such a reading is two volts it is readily apparent that the resistance of the mud cake between electrodes 38 and 40 is two thousand ohms. A constant K is now applied, which has been determined and noted for each individual cell 26, as hereinafter described, to convert this resistance to the ohm/meter/meter$^2$ commonly used in earth resistance determinations.

The constant for each cell is determined by filling chamber 32 with a metal salt solution of a known concentration and at a standard temperature. Such solutions have known resistances at known conditions and reference tables are available having such data in terms of ohm/meter/meter$^2$. The resistance of the salt solution is now measured by the before described method, finding a particular resistance in ohms. The resistance of the same solution at the same conditions is also found, by reference, in ohm/meter/meter$^2$. The actual resistance is then divided by the reference resistance, the quotient then being the constant or K for the particular cell. The geometry of the cells actually constructed in accordance with this invention has been such that a constant K of one hundred was a rough goal. After construction, however, all cells have their constant K individually determined by actual measurement with a known solution.

Thus, it is seen that a mud filter cake specimen having a resistance of two thousand ohms measured in a cell having a constant K of one hundred will have an ohm/meter/meter$^2$ resistance of two thousand divided by one hundred or 20 ohms/meter/meter$^2$.

A resistivity curve for a particular mud at varied temperatures is sometimes desired. The temperature of the specimen may be measured without disturbance of its naturally accumulated condition by providing a subminiature thermocouple junction in the cell chamber 32 intermediate a current electrode and a voltage electrode, preferably in such a manner as to be extended parallel to and in the same plane as said electrodes.

The terminals of such junction may extend through and out from the cell wafer as do the electrodes. Thus provided, the previously described filter cake specimen is also intimately deposited about said junction in the same manner. Thus, resistivity measurements may then be made of a naturally accumulated and undisturbed specimen of mud filter cake at accurately determined temperatures.

It is finally pointed out that the resistivity measurement of the naturally accumulated and undisturbed mud filter cake as provided by this invention has established resistivity measurements which are more consistent and reliable than heretofore obtainable.

While only one embodiment of the invention has been shown and described, it will be apparent that various changes may be made in its construction and arrangement without departing from the spirit of said invention or the scope of the annexed claims.

That which is claimed is:

1. Apparatus for determining the electrical resistivity of drilling mud filter cake which comprises, a measuring cell having a specimen chamber therein of predetermined geometry, measuring electrodes spatially arranged within said specimen chamber, means to deposit a filter cake in said chamber and intimately about said electrodes concurrent with the removal of the filtrate from said filter cake, and electrical resistivity measuring means to measure the electrical resistivity of the filter cake when isolated in said specimen chamber, the arrangement being such that said filter cake specimen is measured in a condition of original deposition.

2. Apparatus for mud filter cake electrical resistivity analysis comprizing, measuring electrodes disposed within a measuring chamber of predetermined geometry, means for accumulating a mud filter cake in said chamber and intimately about said measuring electrodes concurrent with the removal of the filtrate from said mud filter cake, and means for measuring the resistance of said accumulated filter cake, said filter cake in said chamber being in exact condition of accumulation.

3. Apparatus for determining the electrical resistivity of drilling mud filter cake which comprizes, a measuring cell having a specimen chamber therein of predetermined geometry, measuring electrodes spatially arranged within said specimen chamber, filter press means to deposit a filter cake in said chamber and intimately about said electrodes concurrent with the removal of the filtrate from said filter cake, and measuring means in combination with said electrodes to measure the electrical resistivity of the filter cake when isolated in said specimen chamber.

4. Apparatus for mud filter cake electrical resistivity analysis comprizing, electrical resistance measuring electrodes and temperature sensing means disposed within a measuring chamber of predetermined geometry, means for accumulating a mud filter cake in said chamber and intimately about said electrodes and said temperature sensing means concurrent with the removal of the filtrate from said mud filter cake, and means for measuring the resistance and temperature of said accumulated filter cake as originally deposited.

5. Apparatus for determining the electrical resistivity of filter press filter cake which comprizes, a measuring cell having a specimen chamber therein of predetermined geometry, measuring electrodes spatially arranged within said specimen chamber, filter press means to deposit a filter cake in said chamber and intimately about said electrodes concurrent with the removal of the filtrate from said filter cake, and electrical measuring means in combination with said electrodes to measure the electrical resistivity of the filter cake as concurrently deposited in said specimen chamber.

6. Apparatus for mud filter cake electrical resistivity analysis comprizing, means for accumulating a mud filter cake in a chamber and about measuring electrodes disposed within said chamber concurrent with the removal of the filtrate from said mud filter cake, said chamber being of predetermined geometry and means for measuring the resistance of the filter cake exactly as accumulated within said chamber.

7. Apparatus for filter cake electrical resistivity analysis comprizing, measuring electrodes disposed within a measuring chamber of predetermined geometry, means for accumulating a mud filter cake in said chamber and in intimate contact about said electrodes concurrent with the removal of the filtrate from said mud filter cake, and means for measuring the resistance of said filter cake in naturally accumulated condition.

References Cited in the file of this patent

UNITED STATES PATENTS

| | | |
|---|---|---|
| 2,183,492 | Rabl | Dec. 12, 1939 |
| 2,252,222 | Van Os | Aug. 12, 1941 |
| 2,276,841 | Hanson | Mar. 17, 1942 |
| 2,526,636 | Colman | Oct. 24, 1950 |
| 2,646,678 | Standing et al. | July 28, 1953 |
| 2,691,298 | Cook | Oct. 12, 1954 |
| 2,786,977 | Blagg et al. | Mar. 26, 1957 |